Nov. 30, 1937.  W. W. TRICKEY  2,100,884
APPARATUS FOR MAKING BRANCH CONNECTIONS
Original Filed Jan. 29, 1934
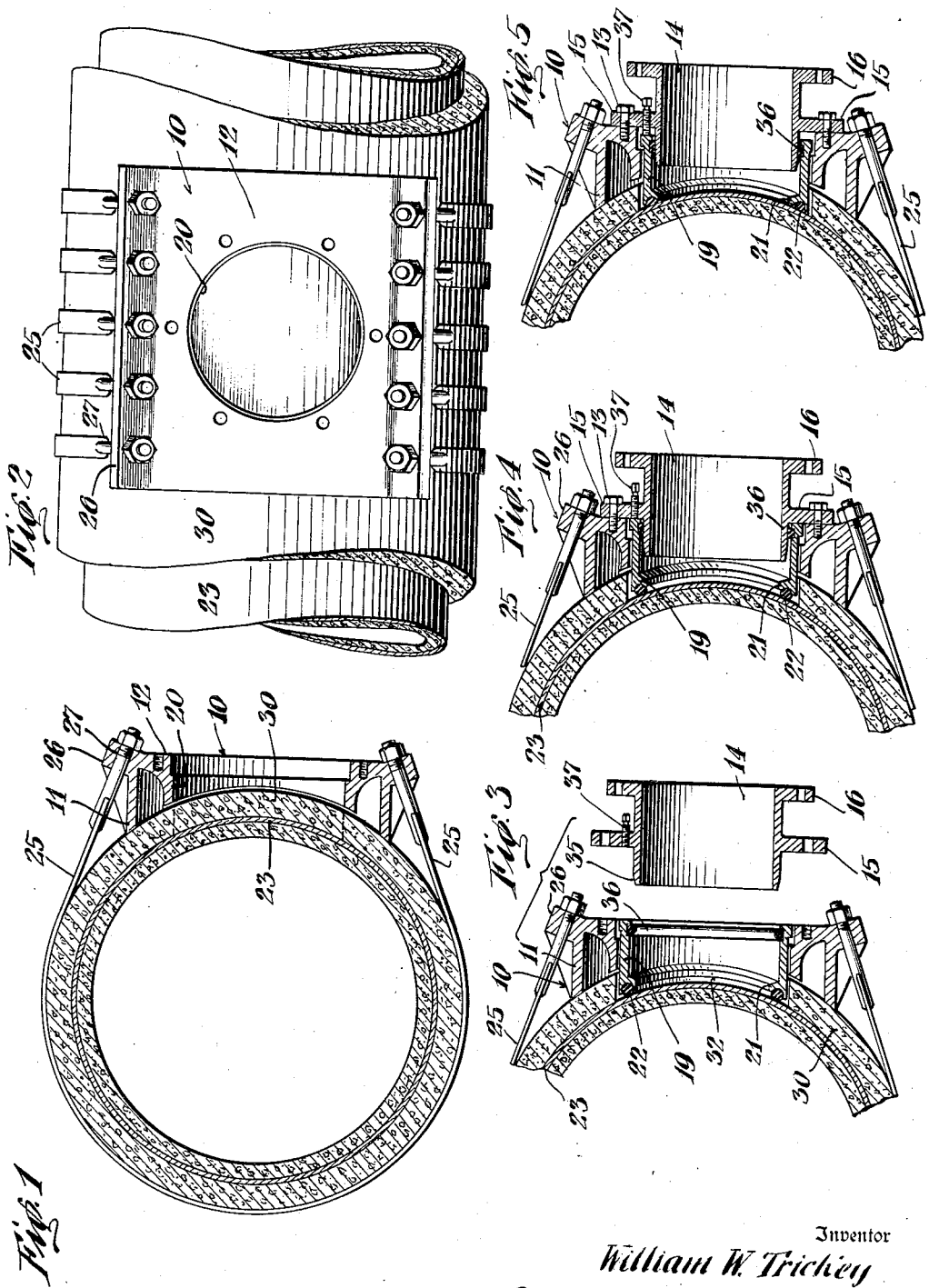
Inventor
William W. Trickey
Cooper, Kerr & Dunham
Attorneys Patented Nov. 30, 1937

2,100,884

UNITED STATES PATENT OFFICE 2,100,884

APPARATUS FOR MAKING BRANCH CONNECTIONS

William W. Trickey, Verona, N. J., assignor to Lock Joint Pipe Company, East Orange, N. J., a corporation of New Jersey Original application January 29, 1934, Serial No. 708,799, now Patent No. 2,050,985, dated August 11, 1936. Divided and this application November 21, 1935, Serial No. 50,927

7 Claims. (Cl. 285—108)

This invention relates to apparatus for making branch connections, and more particularly to apparatus for making under pressure a branch connection with a reinforced concrete pipe of the steel cylinder type.

This application is a division of my copending application Serial Number 708,799, filed January 29, 1934, now Patent No. 2,050,985 of August 11, 1936.

Among the objects of the invention is to provide a novel method and apparatus for making a branch connection to a pipe line of reinforced concrete steel cylinder pipe without reducing the flow of water or pressure within the pipe line.

Another object of the invention is to provide apparatus for making a branch connection with a reinforced concrete steel cylinder pipe which supports the cutting tool, valve and end of branch pipe line from the outside of the concrete pipe so as to obviate direct attachment to and resulting strains upon the reinforcing embedded within the concrete pipe.

Another object of the invention is to provide apparatus which has provisions for sealing the branch connection to be attached thereto against the metallic reinforcing cylinder which forms an integral part of the pipe to which the branch connection is to be made; and to provide apparatus which is not limited in usefulness because of the unavoidable variation in thickness of the concrete which constitutes the covering material upon the outside of the steel reinforcing cylinder.

Other objects and advantages of the invention will be described hereinafter in the specification and in the claims which follow.

In the drawing, Fig. 1 is a sectional view through a main pipe showing the location for making the branch connection.

Fig. 2 illustrates the saddle by which the apparatus is secured to the outside of the main pipe.

Fig. 3 is a sectional detail of parts of the apparatus with a connector pipe ready for assembly.

Fig. 4 is a showing similar to Fig. 3 with the connector pipe mounted in position upon the saddle.

Fig. 5 is a similar showing of the apparatus in condition for mounting a valve.

The invention provides for supporting the valve and cutting tools by attachment to the outside of a main pipe line so as to avoid placing undesired stresses upon the steel cylinder of the pipe where the cylinder has been cut for the connection.

In the drawing 10 is a saddle which has an outside wall portion 11 adapted to rest against the outer surface of a pipe. The saddle may be made as a one-piece casting and given such dimensions as will provide the strength necessary for supporting the load of the pipe connection. The portion of the saddle which is opposite the outside of the pipe is given a concave curvature corresponding to the curvature of the outside circumference of the pipe to which the saddle is to be attached, and preferably it is so proportioned that only the wall portion 11 will bear against the outside surface of the pipe. The saddle is provided with a flat surface 12 which is tapped to receive machine screws 13 (Fig. 4) by which a connector pipe 14 may be secured to the saddle. The connector pipe is provided with a flange 15 which is to be brought against the surface 12 by means of screws 13 when the connector pipe is secured to the saddle.

The connector pipe 14 is provided with means for connecting a section of pipe or a valve to the apparatus of the present invention, such as flange 16.

While different devices are available for tapping pressure pipe, difficulty has been encountered in making use of such devices for tapping concrete pipe owing to the fact that no satisfactory means had been devised to make a water-tight connection between the branch line and the cylinder reinforcement embedded in the main pipe wall. Under the pressures for which reinforced concrete steel cylinder pipe is built a safe water-tight connection between a tapping sleeve or saddle and the concrete covering on the outside of the cylinder is not practical due to the inability of the concrete to withhold the water under such pressures. The difficulty in making a water-tight connection between the branch line and the steel cylinder also was due, in part, to the irregularities in thickness and curvature of the outside concrete produced under the manufacturing methods generally practiced. The apparatus of the present invention comprises means for making a water-tight seal between the branch line and the steel cylinder in the main line.

For providing a seal between the main pipe and the branch line a gland comprising a follower sleeve and gasket or packing is provided. The follower sleeve 19 is adapted to fit within the opening 20 of the saddle and its inner end is provided with a groove 21 for seating a gasket or packing 22 which may be placed in position against the steel cylinder 23 by hand or by affixing the same in the groove. When compressed against the cylinder 23, the gasket is in such a position as to seal against any leakage between the steel cylinder and the follower sleeve. The gasket may be made from any kind of compressible or pliable material which is ordinarily used for sealing purposes, such as, for example, rubber, asbestos, fiber-filled lead gaskets, etc.

When a pipe line is to be tapped the place for making the branch connection is located by mounting the saddle 10 in position in the manner illustrated in Figs. 1 and 2. The saddle is held against the exterior surface of the pipe by means of bands 25 encircling the exterior of the covering material of the pipe. The ends of the bands extend through holes in lugs 26, 27 upon the saddle where they are engaged by nuts. The bands and saddle provide compensatory reinforcing to the main pipe for loss in strength occasioned when its regular reinforcing constituting the steel reinforcing and any supplemental wiring is cut.

A hole is then cut through the outside covering material 30 of the pipe by removing a section thereof having an area corresponding with the cross-sectional area of opening 20 in the saddle. This covering material or concrete may be removed by workmen using hand tools or a drilling machine. All the material in this area is removed down to the steel cylinder 23 of the main pipe so that a hole is left similar to that appearing at 32, Fig. 3.

The gland 19 is then mounted within the saddle and moved forward into the position illustrated in Figs. 3 and 4, in which the gasket 22 is in a contacting position with the exterior surface of the steel cylinder 23.

The connector pipe 14 is then mounted upon the saddle by the use of screws 13 in the manner illustrated in Fig. 4. This connector pipe is provided with a tapered surface 35 adapted to engage a gasket or packing 36 and seat the same within its recess in the gland. The gasket may be made of any suitable material for affording a good seal, as is the case for gasket 22, and may be mounted as a ring upon the outside of connector pipe 14 or upon the interior of gland 19 depending upon whether the gland or the connector pipe 14 is provided with the guide or wedging surface. As the screws 13 are tightened, the wedging surface 35 compresses the gasket between the gland and connector pipe so as to create a sealing condition against leakage of fluid between these two members, Fig. 4.

With the connector pipe in position the gland may be moved toward the steel cylinder by means of adjusting screws 37 carried by the connector pipe. The packing 22 at the inner end of the gland is thereby compressed against the exterior surface of the steel cylinder 23, as shown in Fig. 5.

After the apparatus has been assembled in this manner, a valve may be bolted to the flange 16 of the connector pipe. A cutting device is then used to cut a hole through the steel cylinder and pipe lining of the main pipe. This may be done with a cutting device of suitable design such, for example, as that described in United States Patent No. 2,050,985.

While the form of mechanism herein shown and described is admirably adapted to fulfill the objects primarily stated, it is to be understood that it is not intended to confine the invention to the one form of embodiment herein disclosed, for it is susceptible of embodiment in various form all coming within the scope of the claims which follow.

What is claimed is:

1. Apparatus for making a branch connection with a reinforced concrete pipe of the steel cylinder type having a concrete exterior, comprising in combination, a saddle for supporting the branch connection, said saddle having a bearing surface for contacting with the exterior wall of the concrete pipe with which connection is to be made, and an opening to frame an area of the exterior wall of the concrete pipe, a connector pipe carried by said saddle, means for supporting the saddle and connector pipe with the bearing surface of the saddle held against the exterior wall of the concrete pipe, said supporting means including bands adapted to be tensioned about the exterior of the concrete pipe, a tubular gland mounted within the opening in said saddle and adapted to extend beyond said opening and below the exterior surface of the concrete pipe against which the saddle is to rest, said gland and connector pipe together forming a conduit through the saddle for the conveyance of fluid between the interior of the concrete pipe and the connector pipe, and means carried by the connector pipe for maintaining the gland in sealing position against an interior portion of the wall of the concrete pipe to which connection is to be made.

2. Apparatus for making a branch connection with a reinforced concrete pipe of the steel cylinder type having a concrete exterior, comprising in combination, a saddle for supporting the branch connection, said saddle having an opening which frames an area of the concrete pipe with which connection is to be made when the same is tapped, means for supporting the saddle by attachment to the exterior of the concrete pipe, a connector pipe, means for securing said connector pipe to said saddle, a tubular gland for fitting within the opening in said saddle and adapted to extend through the exterior surface of the concrete pipe upon which the saddle is to rest, said gland also providing a sliding adjustable joint with the connector pipe, and means engaging said connector pipe and said gland for advancing said gland in relation to said connector pipe and into position against the steel cylinder reinforcing of the concrete pipe.

3. Apparatus for making a branch connection with a main pipe, comprising in combination, a saddle having a bearing element adapted to rest and be supported upon the exterior of a main pipe to which connection is to be made, means for supporting said saddle upon the exterior of such main pipe, a connector pipe carried by said saddle, said connector pipe having means for contacting with the saddle when secured thereto and means for supporting the branch connection to be made to the main pipe, means for securing said connector pipe and said saddle in rigid relation so that the connector pipe and branch connection to be made thereto is wholly supported by the saddle, a tubular gland disposed within a bore in said saddle, and means cooperatively associated solely with said connector pipe and gland for adjustably positioning said gland in respect to said connector pipe for bringing about a sealed relation between the gland and a portion of the wall of the main pipe.

4. Apparatus for making a branch connection with a main pipe, comprising in combination, a saddle having a bearing element adapted to rest upon the exterior of the main pipe to which connection is to be made and a bore to be positioned opposite an opening in the main pipe, means for maintaining and supporting said saddle in place against the exterior of such main pipe, a connector pipe having a portion thereof extending within the bore in said saddle, means for rigidly securing said connector pipe to said saddle so as to wholly support the connector pipe by the saddle, a tubular gland disposed within the bore in the saddle and adjacent the portion of said connector pipe extending within the bore in the saddle, and adjusting means between the connector pipe and gland for adjustably positioning said gland in respect to said connector pipe to bring about a sealed relation between the gland and the main pipe.

5. Apparatus for making a branch connection with a main pipe comprising in combination, a saddle, means for supporting said saddle upon the exterior of a main pipe, said means comprising at least one band secured to the saddle and together with the saddle girdling the main pipe, a connector pipe fixed to and wholly carried by said saddle, said connector pipe serving to transmit the load of a branch connection directly to the saddle and main pipe, a tubular gland intermediate the connector pipe and main pipe and providing seals between itself and each of the main pipe and connector pipe, said gland together with the connector pipe constituting a conduit through the saddle so that fluid communication between the main pipe and branch connection is independent of the saddle, and means for adjusting the position of said gland relative to the main pipe and connector pipe.

6. Apparatus for making a branch connection with a main pipe comprising in combination, a saddle, means for supporting said saddle on a main pipe, a tubular gland mounted within an opening constituting the bore of said saddle, a connector pipe secured to said saddle, means engaging said connector pipe and said gland for adjusting the position of said gland within the bore of said saddle in relation to the connector pipe and saddle, means upon the gland for sealing the gland against the main pipe, and other sealing means between the gland and the connector pipe whereby the gland serves as a fluid conduit between the main pipe and connector pipe without engagement with the saddle.

7. A branch connection comprising a main reinforced concrete pipe having a steel cylinder reinforcing embedded in concrete, a saddle member seating against the outside of said main pipe in location where the pipe is open for the branch connection, means holding said saddle member in place, said means being connected with the saddle member and together therewith girdling and reinforcing said pipe in the vicinity of the location where the pipe is open, a branch pipe carried by the saddle, said branch pipe being attached directly to the saddle so that the weight of the branch pipe is carried by the saddle, and sealing means comprising a tubular gland which serves as a conduit between the branch pipe and main pipe, said sealing means having a portion thereof disposed within an opening in the concrete exterior of the main pipe and seated against the exterior surface of the steel cylinder reinforcing and outside of the opening therein through which access is had between the main pipe and branch pipe.

WILLIAM W. TRICKEY.